(12) United States Patent
Mirzabekov et al.

(10) Patent No.: US 6,656,725 B2
(45) Date of Patent: Dec. 2, 2003

(54) METHOD OF FABRICATION OF MICROARRAY OF GEL-IMMOBILIZED COMPOUNDS ON A CHIP BY COPOLYMERIZATION

(75) Inventors: Andrei Mirzabekov, Darien, IL (US); Edouard Timofeev, Moscow (RU); Vadim Vasiliskov, Moscow (RU)

(73) Assignee: The University of Chicago, Chicago, IL (US)

( * ) Notice: Subject to any disclaimer, the term of this patent is extended or adjusted under 35 U.S.C. 154(b) by 49 days.

(21) Appl. No.: 09/930,865

(22) Filed: Aug. 15, 2001

(65) Prior Publication Data

US 2003/0036063 A1 Feb. 20, 2003

(51) Int. Cl.⁷ ................................................ C12M 1/34
(52) U.S. Cl. .............................. 435/287.2; 435/288.3; 435/288.4
(58) Field of Search ..................... 435/287.2, 288.3, 435/288.4; 422/68.1, 101, 104

(56) References Cited

U.S. PATENT DOCUMENTS

| 5,861,247 | A | | 1/1999 | Mirzabekov et al. |
| 5,932,711 | A | * | 8/1999 | Boles et al. ............... 536/22.1 |
| 5,981,734 | A | * | 11/1999 | Mirzabekov et al. ...... 536/25.3 |
| 6,174,683 | B1 | * | 1/2001 | Hahn et al. .................... 435/6 |
| 6,183,970 | B1 | * | 2/2001 | Okano et al. .................. 435/6 |
| 6,372,813 | B1 | * | 4/2002 | Johnson et al. ............. 522/114 |

OTHER PUBLICATIONS

Vasiliskov, et al.; "Fabrication of Microarray of Gel–Immobilized Compounds on a Chip by Copolymerization"; _BioTechniques_; Sep. 1999; p. 592–605; vol. 27 No. 3.

* cited by examiner

*Primary Examiner*—Kenneth R. Horlick
(74) *Attorney, Agent, or Firm*—Cherskov & Flaynik (57) ABSTRACT

A method for making polymerized molecules is provided whereby a solution containing monomer is contacted to a solid substrate so as to form discrete accumulations of the monomer on the substrate; and the accumulations are contacted with a polymerizing agent, wherein the agent is dispersed in a vehicle which prevents cross contamination of the accumulations.

12 Claims, 5 Drawing Sheets

FIG 1

Figure 2. Schemes of persulfate- (A) and photo-induced (B–D) polymerization of the microchip gel pads. (A) Persulfate-induced polymerization. Drops of polymerized solutions M1–M4 are applied on a glass plate and polymerized. (B) A polymerization chamber is subsequently filled with polymerization solutions M1–M4 and is illuminated each time through a changeable mask containing a transparent window in a different position. (C) The same as in B, but the windows in the different positions of the mask are projected onto the polymerization chamber through a microscope. (D) Simultaneous polymerization of four solutions under a mask.

3'-TCAGTGXAGT-5'-allyl

METHOD OF FABRICATION OF MICROARRAY OF GEL-IMMOBILIZED COMPOUNDS ON A CHIP BY COPOLYMERIZATION

CONTRACTUAL ORIGIN OF THE INVENTION

The United States Government has rights in this invention pursuant to contract number W-31-109-ENG-38 between the U.S. Department of Energy and the University of Chicago representing Argonne National Laboratory.

BACKGROUND OF THE INVENTION

1. Field of the Invention

This invention relates to a method for making polymerized molecules and more particularly, this invention relates to a method for preparing polymer gel grids or arrays on a solid surface via copolymerization wherein each discrete element in the array contains different tethered molecules.

2. Background of the Invention

The manufacturing and use of microchips containing arrays of immobilized oligonucleotides and DNA is a rapidly developing field. Such microchips have been applied for diagnostics of mutations, screening single-nucleotide polymorphisms, identification of microorganisms, monitoring gene expression, as well as for other analytical purposes.

The inventors previously conceptualized and developed microarrays of gel-immobilized compounds on chips (MAGIChips™), containing oligonucleotides, DNA, or proteins. The three-dimensional gel support of MAGIChips provides some essential advantages. The gels have much higher capacity, allowing the immobilized molecules to be well spaced from each other and to interact with the test compound in more homogeneous fashion than when the molecules are attached to solid supports. The glass surface separating the gel pads is treated to become hydrophobic, preventing the exchange of water solution between adjacent gel pads and allowing different chemical and enzymatic reactions to be carried out in the individual gel pads. The gel pads are essentially microtest tubes with volumes ranging from pico-liters to nanoliters.

Oligonucleotide arrays can be fabricated by parallel synthesis directly on a support. See U.S. Pat. No. 5,861,247 awarded to the instant Assignee on Jan. 19, 1999. The photodirected synthesis of oligonucleotides in situ was demonstrated to be highly efficient for manufacturing microchips of high complexity and density.

However, a need exists in the art for a method to produce biochips to accommodate synthetic and natural compounds. The method should utilize standard laboratory solutions in a minimal number of steps to produce the biochips. The method should also minimize any chance for cross contamination or chemical communication between discrete entities on the biochip. A myriad of solid support substrates should also be appropriate.

SUMMARY OF THE INVENTION

It is an object of the present invention to provide a method for polymerizing molecules on a solid substrate that overcomes many of the disadvantages of the prior art.

Another object of the present invention is to provide a simple method for polymerizing monomers into discrete entities. A feature of the invention is that the polymerizing means is dispersed in a vehicle for preventing chemical communication between entities. An advantage of the invention is that the contents of each of entities do not mix with each other.

Still another object of the present invention is to provide a method for making porous polymers containing different molecules tethered therein. A feature of the invention is that the polymers are arranged in close proximity to each other yet contain different molecules, such as oligonucleotides, nucleic acids, and low molecular weight compounds, each of which contain an unsaturated moiety prior to combination with the constituent material comprising the porous polymers. In one protocol, the unsaturated moiety covalently combines with the constituent material in an elimination reaction. Another feature of the invention is that the polymers are produced either via serial application of reactants or a simultaneous application of reactants. An advantage of the invention is that it facilitates rapid production of biochips with a minimal amount of contamination between adjacent polymer structures.

Briefly, the invention provides for a method for making discrete porous polymeric structures wherein each structure contains different molecules, the method comprising contacting a solution containing monomer to a solid substrate so as to form discrete accumulations of the monomer on the substrate; and contacting the accumulations with a means for polymerizing the monomer, wherein the means is dispersed in a vehicle which prevents cross contamination of the accumulations.

BRIEF DESCRIPTION OF THE DRAWINGS

The objects and advantages of the present invention will become readily apparent upon consideration of the following detailed description and attached drawings, wherein.

DETAILED DESCRIPTION OF THE INVENTION

The inventors have found that the manufacturing of oligonucleotide and protein microchips is significantly simplified by using the derivatives of these compounds capable of radical polymerization.

Disclosed herein are two protocols for polymerizing acrylamide with oligonucleo-tides to manufacture biochips. The biochips are known in the art as MAGIChips™, as trademarked by the instant Assignee. Specifically, protocols are disclosed for the persulfate- and photo-induced copolymerization of acrylamide with oligonucleotides and proteins containing unsaturated residues to manufacture MAGI-Chips. The procedure described herein can be applied to fabricate low- and high-density microchips containing different natural and synthetic compounds. Salient features of the invented protocol are disclosed in Vasiliskov et al. *Biotechniques* 27, No 3, pp. 592–605, incorporated herein by reference. The Vasiliskov reference was part of the Provisional Patent Application filed in this matter on Aug. 16, 2000.

The unsaturated units were conjugated with biomolecules via two different routes. In one approach, monomer-phosphoramidites were synthesized to incorporate the unsaturated units into oligonucleotides. Alternatively, a protein to be copolymerized was chemically attached to the monomer containing double bonds.

Functional groups required for immobilizing different substances are incorporated into the gel either by modification of amide groups of polyacrylamide or by copolymerization of acrylamide/bisacrylamide with appropriate unsaturated compounds, the later containing, in some cases, proper protective groups. Active binding sites are generated by chemical modification of the incorporated groups or by deprotection.

Generally, oligonucleotides containing 5'-allyl or 5'-butenediol units were synthesized using phosphoramidite chemistry. When proteins (instead of simple oligonucleotides) are utilized, acryloyl residues are attached to a protein by a two-step procedure.

Solidification or polymerization of the double-bond-modified biomolecule to the substrate material is carried out either photochemically, or via the use of a radical agent such as a persulfate compound. Co-polymerization was carried out in drops of aqueous solution of monomers containing ammonium persulfate. Drops with different allyl-oligonucleotides were distributed in discrete entities or accumulations on a solid substrate such as a glass slide. Polymerization was induced by diffusion of N,N,N',N'-tetramethylethylenediamine (TEMED) from a hexane solution that covered the aqueous drops.

Oligonucleotide

Synthesis Detail

Oligonucleotides were synthesized on an ABI-392 DNA/RNA synthesizer (Applied Biosystems) using standard phosphoramidite chemistry. The butendiol (HO—$CH_2$—CH=CH—$CH_2$—O—) or allyl ($CH_2$=CH—$CH_2$—O—) units were incorporated into the oligonucleotides on the 5'-end via corresponding to protected phosphoramidites. No cycle changes were made for this modification, except for the substitution of the standard oxidizing solution for 1 M tert-butyl hydroperoxide in tetrahydrofuran. The 3'-amino group was introduced by using C7-amine support from Glen Research.

Oligonucleotides were purified by reverse-phase HPLC on a $C_{18}$ Nucleosil (Sigma) column or by denaturing polyacrylamide gel electrophoresis.

1-O-(4,4'-Dimethoxytrityl)-2,3-buten-4-ol (1a) was synthesized by the method described in M. Smith, et al, *J. Am. Chem. Soc.* 84, 430–440, and incorporated herein by reference.

1-O-(4,4'-Dimethoxytrityl)-4-O-(P-β-cyanoethyl-N,N-diisopropylaminophosphinyl)-2,3-buten (IIa) and allyloxy-(β-cyanoethyl)-N,N-diisopropylphosphoramidite (IIb) were synthesized by known methods (e.g. J. A. Grasby et al., *Nucliec Acids Res.* 21, 4444–4450, and incorporated herein by reference, from (Ia) and allyl alcohol, respectively.

The modification of streptavidin was carried out in 100 μl solution containing 3.3 nmol streptavidin in 100 mM HEPES, pH 7.5, with 36 nmol sulfosuccinimidyl-4-(N-maleimidomethyl)cyclohexane-1-carboxylate (added in 2 μl of DMSO) for 18 h at 4° C. The protein was purified by gel filtration on Sephadex G-25 (Pharmacia Biotech) in 10 mM MES, pH 6.2, and concentrated on Centricon-30 (Amicon).

A 10 mM solution of N,N'-acryloylcysteamine in 20 mM MES buffer, pH 6.2, was reduced with 1.2 molar excess of tris-(2-carboxyethyl)phosphine-HCl for 10 min at room temperature. The maleimido-streptavidin conjugate was treated by 50 molar excess of reduced N,N'-acryloylcysteamine in 20 mM MES, pH 6.2, at 4° C. for 1 h. Acryloyl-streptavidin was purified by gel filtration on Sephadex G-25.

Polymerization

Solution Detail

The oligonucleotide copolymerization solution contained 5% acrylamide/bisacrylamide (19:1), 40% glycerol, 0.1 M sodium phosphate buffer, pH 7.0, 1.2% TEMED, 0.002% methylene blue, and 0.3 mM allyl- or butendiol-oligonucleotides. Other suitable compounds, which polymerize in the presence of radicals include, but are not limited to, acrylamide/bisacryl-amide, N[2,2-dimethoxy]acylacrylamide, N,N,N',N'[1,2-dihydroxyacyl]bisacrylamide, N-acryoyl tris[hydroxymethyl]amino methane, N,N'diallyl tartardiamide, and combinations thereof.

Photopolymerization was carried out either in a 254 nm Stratalinker 1800 UV oven (Stratagene) with 8-W lamps 4 cm away from the slide at room or under a specially designed fluorescent microscope (see "Results"). The time of irradiation was selected experimentally. After copolymerization the microchips were washed with distilled water for 1 hour at 60° C. and dried.

Figure 2:
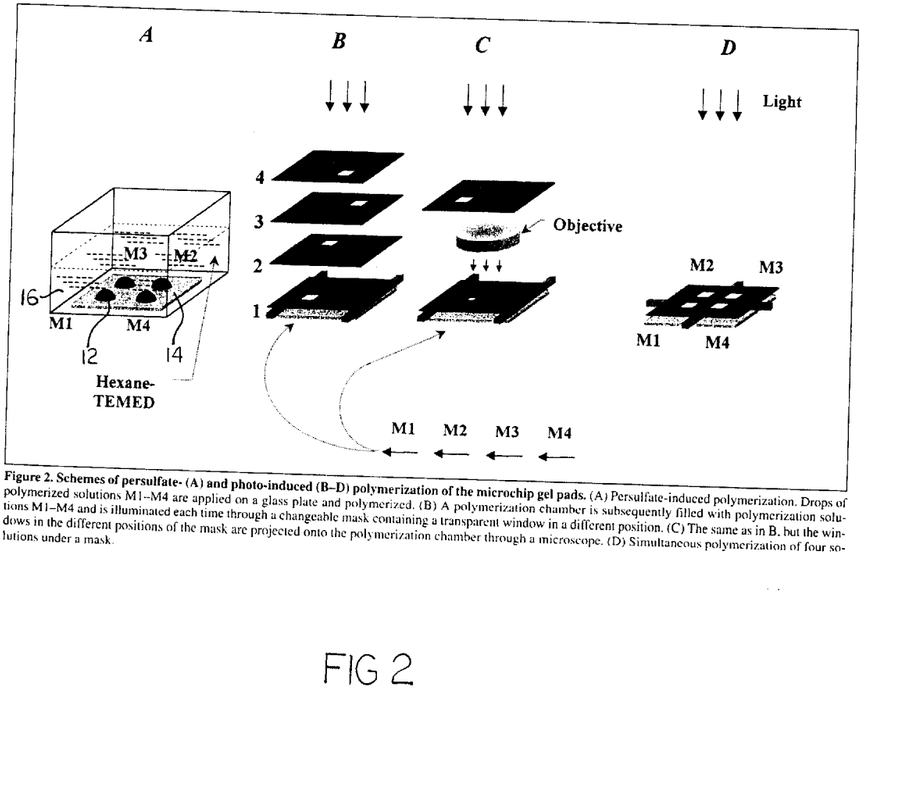
FIG. 2 is a schematic diagram of persulfate (A) and photo-induced (B–D) polymerization of microchip gel-pads.
Figure 3:
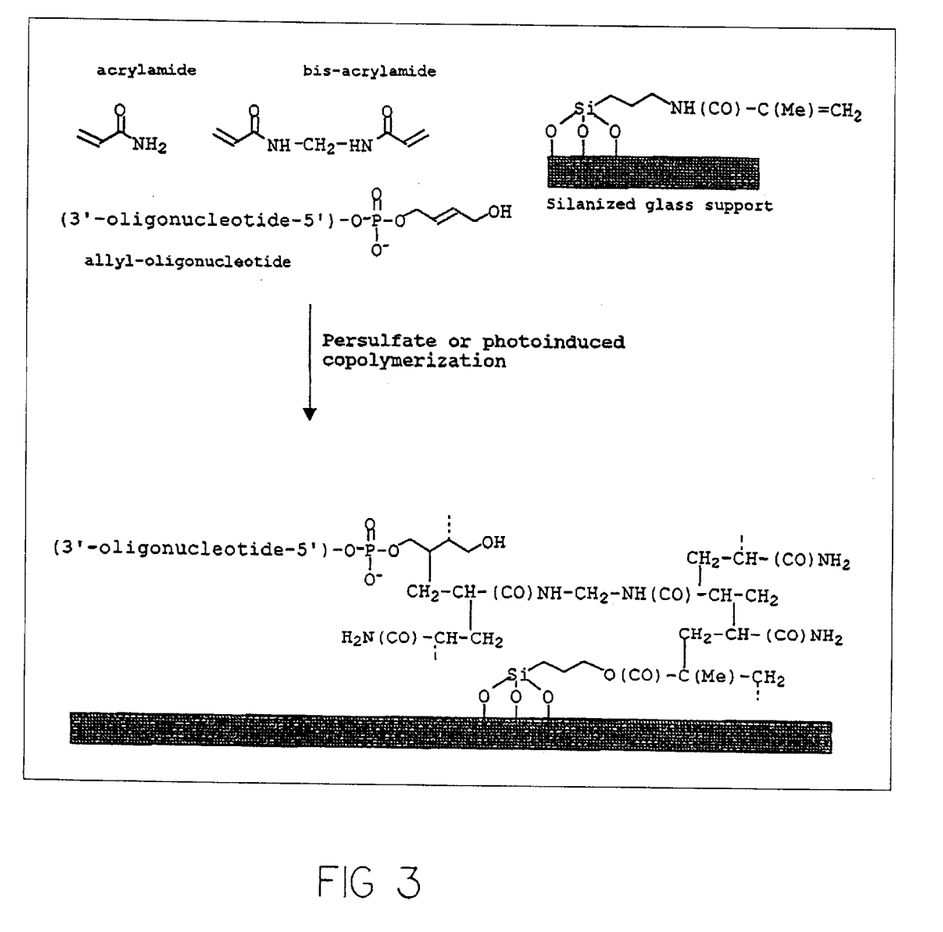
FIG. 3. is a reaction sequence for chemical- and photo-induced copolymerization of oligonucleotides with an acrylamide compound, in accordance with features of the present invention.

Microchips with 500 μm polyacrylamide squares were prepared by subsequent cycles of photo-copolymerization of different allyl-oligonucleotides with acrylamide. After every photocopolymerization cycle the slide was washed for 5 min, and the mask and allyl-oligonucleotides were changed. The masks were designed to have one square window in different places of the polymerization area (FIG. 2B).

Alternatively, the polymerization area was divided into four sectors with a cross-like Teflon spacer. Each polymerization sector was filled with a monomer mixture, containing one of four allyl-oligonucleotides. The polymerization solutions in the four sectors were illuminated simultaneously through a mask (FIG. 2D).

Photo-Induced

Copolymerization Detail

Figure 1:
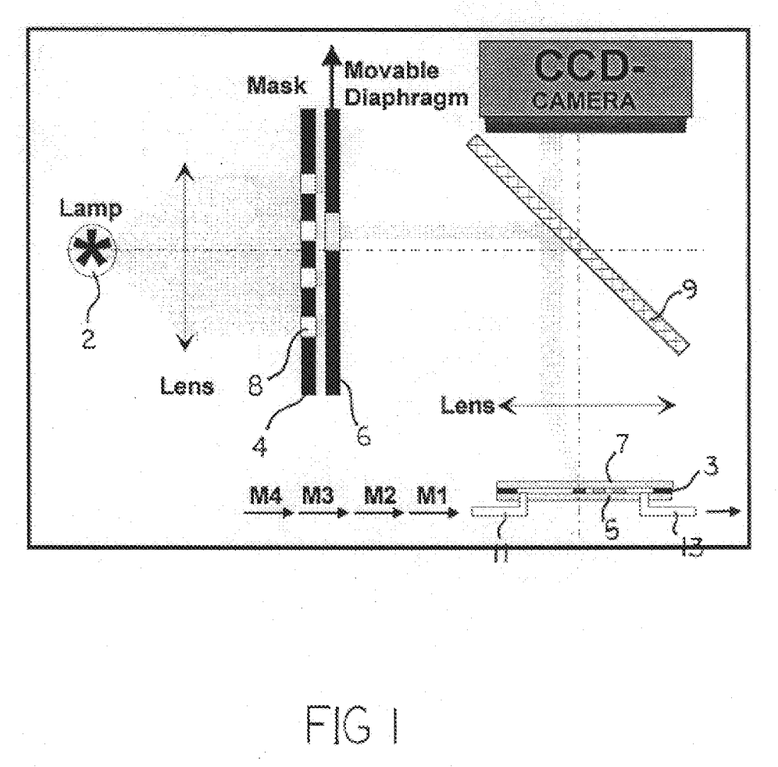
FIG. 1. is a schematic diagram of a microchip gel-polymerization device.

Photopolymerization was carried out as described in U.S. Pat. No. 5,861,247 discussed supra, and incorporated herein by reference. An exemplary photopolymerization device is schematically depicted in FIG. 1.

Small oligonucleotide-containing gel pads were photopolymerized by projecting the mask on the monomer solutions with a microscope. Visible (halogen lamp) or UV (mercury lamp) light 2 is converted into a parallel beam with a condenser. The beam is directed through a mask 4 and a diaphragm 6 on a polymerization chamber. The mask contains 10×10 array of transparent 100×100 μm square windows 8 spaced by 200 μm. The diaphragm is a horizontal slot that can be moved to open successively only one line of windows in the mask. The light that passes through a line of windows is projected through an objective as 10×10 μm illuminated squares on a monomer solution. A semitransparent mirror 9 is used to monitor the pattern of illumination visually or with a CCD-camera. The polymerization chamber is formed by a glass slide 7 and a quartz plate 5 separated with Teflon or polyethylene spacers of appropriate thicknesses. An exemplary spacer is a 5 μm polyethylene lining 3. Optionally, the glass slide was pretreated with 3-(triethoxysilyl)propyl-acrylamide and the second slide or the quartz mask with Repel-Silane (Pharmacia Biotech).

The chamber contains an inlet 11 and outlet 13 to provide a means of ingress and egress respectively to facilitate filling the chamber successively with polymerization solutions containing different oligonucleotide monomers M1–M4.

Illumination of methylene blue with UV or visible light produces radicals that initiate polymerization of acrylamide/bisacrylamide. The pattern of the illuminating light created with a mask determines the size and the arrangement of the microchip gel pads. The mask is a quartz or glass plate covering the polymerization chamber from one side, which is exposed to UV or visible light. It contains transparent windows of a specified arrangement etched in the 1-μm thin chromium film (FIGS. 2B and 2D). Alternatively, the mask image can be projected onto polymerization solution with an optical device (FIG. 2C).

A mask containing transparent windows determines the size and the geometry of the gel pads. The mask can constitute the top cover of the hybridization chamber.

Projection of a mask image through a microscope onto a polymerized solution allows one to decrease the size of the polymerized gel pads to 10×10 μm. Preliminary experiments have shown that this size can be further diminished to 3×3-μm (results not shown).

Various solutions to be used for microchip fabrication should be either placed under specified windows of the mask or orderly run through the hybridization chamber to be successively illuminated at different locations through the mask. A laser beam can also be used with the same results for successive illumination of specified sites of the polymerization chamber.

EXAMPLE 1

The protein copolymerization solution contained: 5% acrylamide/bisacrylamide (19:1), 30% glycerol, 1.2% TEMED, 40 mM Tris-HCl, pH 8.0, 0.31% HCl, 1 mM EDTA, 0.0025% methylene blue, and 400 pmol of acryloyl-modified protein. The solution was irradiated through a mask with UV light as described above. The microchip was washed with water for 10 min, twice with phosphate-buffered solution (PBS) (0.14 M NaCl, 10 mM sodium phosphate, pH 7.4) containing 0.1% Tween 20 for 10 min, then with water for two days, and dried.

Persulfate-Induced

Copolymerization Detail

Persulfate-induced copolymerization is more convenient than photopoly-merization technique for working with individual drops of solution applied on a microchip. Generally, the chemistry involved in this polymerization scheme is disclosed in J. Sambrook et al, *Molecular Cloning: A Laboratory Manual* $2^{nd}$. Ed. (CSH Laboratory Press, Cold Spring Harbor, N.Y., 1989), and incorporated herein by reference.

While TEMED is a required component of a persulfate-initiated polymerization scheme, TEMED is not present when co-monomers (the biomolecules and the acrylamide molecules) are first applied to the inert substrate. This way, polymerization of the components is prevented prior to their placement onto the substrate. TEMED is later applied through its dispersion through a non-polar vehicle, which simultaneously submerges all monomer placements on the substrate. The non-polar vehicle assures that no cross contamination between placements occurs.

A drop 12 of the mixture of acrylamide/bisacrylamide and allyl-oligonucleotides to be polymerized was applied to a glass slide 14 or some other relatively nonporous substrate. The solution contained glycerol to prevent the drying of the droplets. To avoid polymerization of the solution before its application, a two-phase liquid system developed for crosslinking of compounds to the microchip gels was used. That system is described in D. Proudnikov et al., *Anal Biochem.*, 259, 34–41, and is incorporated herein by reference. As noted supra, the applied droplets contained all polymerization components except TEMED, which is essential for the polymerization.

The glass slide with the droplets of monomer mixtures was covered with a solution of TEMED in hexane 16 or some other suitable nonpolar substance that is not miscible with the droplets. These other suitable nonpolar vehicles include, but are not limited to chloroform, dichloroethane, and mineral oil. The nonpolar layer phase, which forms the second phase, does not mix with water and thus separates the drops from each other and prevents their cross-contamination. TEMED diffuses into the drops from the nonpolar layer and initiates polymerization. In essence, the TEMED is delivered to each reaction zone (defined by each droplet) through an aqueous-organic interface.

EXAMPLE 2

An exemplary persulfate-induced polymerization protocol is as follows: 0.2 μl solution containing 5% acrylamide-bisacrylamide (19:1), 0.1 M sodium phosphate, pH 7.0, 40% glycerol, 0.05% ammonium persulfate, and 0.3 mM allyl-oligonucleotide was spotted onto the surface of a glass slide with a pipette. The slide was pretreated with 3-(triethoxysilyl)propylacrylamide. The glass slide loaded with monomer mixtures was covered with 80 ml of 0.5% TEMED in hexane (FIG. 2A). After polymerization at room temperature for 1 hour, the microchip was washed with water.

Oligonucleotide microchips were hybridized with 1 μM solution of fluorescently labeled complementary target in 6×SSPE buffer, containing 1% Tween 20. The hybridization temperature and time were optimized for each labeled target.

Microchips with gel-immobilized streptavidin were incubated overnight with $1\times10^{-4}\%$ biotin-fluorescein conjugate (Molecular Probes) in a buffer containing PBS and 0.1% Tween 20, then washed 5 times for 10 min with the buffer and stored in sterile PBS at 4° C.

Fluorescence measurements on oligonucleotide and protein microchips, and on-chip melting curve registration were carried out in real time on an automatic setup. The setup consisted of two-wavelength fluorescence microscope, CCD-camera, Peltier thermotable, temperature controller, and a computer equipped with a data—acquisition board and data—processing software.

Oligonucleotide and Protein

Monomers Detail

As noted supra, this invented process simplifies the manufacturing of biochips via the utilization of derivatives of biomolecules capable of radical polymerization. For example, Streptavidin, a protein used in preparation of microchips, was modified with acryloyl groups incorporated by conjugation, with maleimide, followed by treatment with acryloylcysteamine.

Oligonucleotides were modified using unsaturated phosphoramidite monomers during conventional oligonucleotide synthesis. Acrylamide derivatives could not be used as phosphoramidites since they could not sustain the rather hard conditions of oligonucleotide synthesis and deprotection (results not shown). As an alternative, stable unsaturated allyl- and butendiol-phosphoramidites were synthesized and the standard method for oligonucleotide synthesis was slightly modified to produce corresponding oligonucleotides. Despite the lower activity of allyl compounds in copolymerization compared with acrylamide, the level of incorporation may be considerably increased by introducing several allyl- and butendiol groups into an oligonucleotide.

Figure 4:
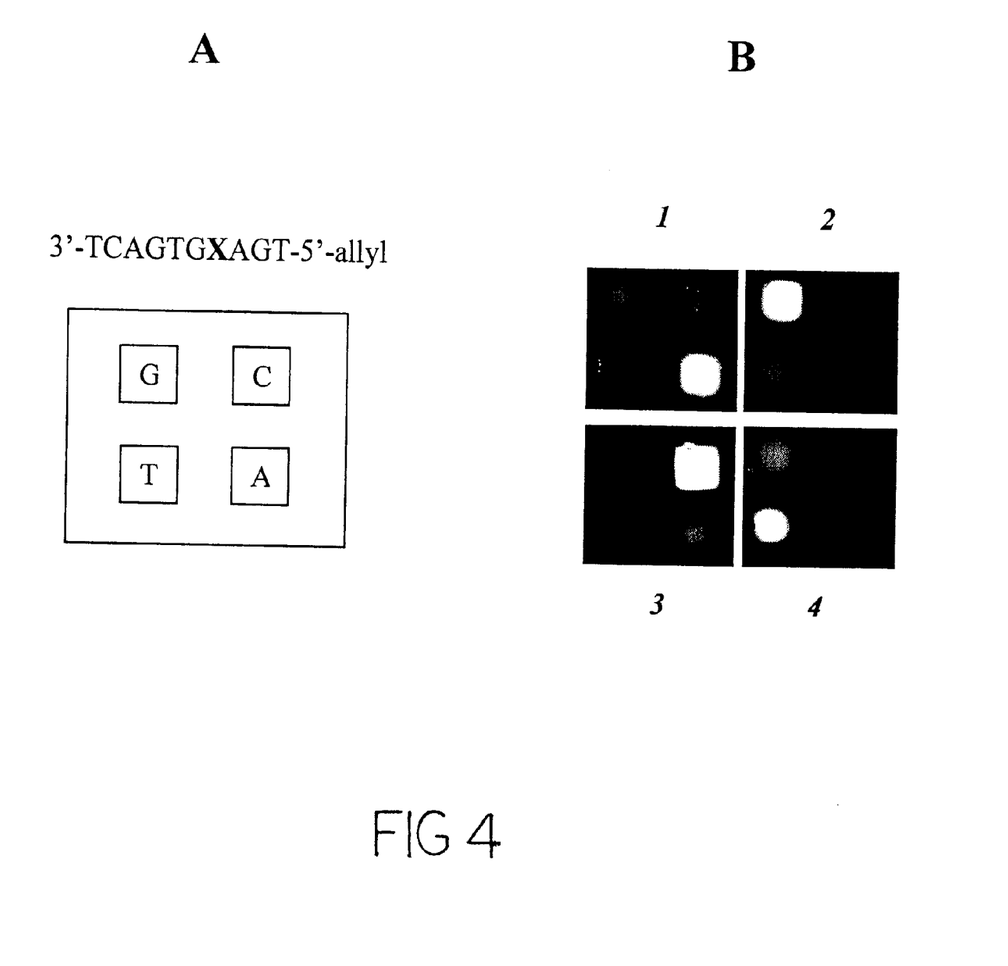
FIGS. 4A and 4B depict an oligonucleotide microchip prepared by photoinduced simultaneous co-polymerization of four allyl-oligonucleotides, in accordance with features of the present invention.

FIG. 4 shows a microchip produced by UV-induced copolymerization of acrylamide/bisacrylamide with acryloyl-streptavidin. The microchip staining with a biotin-fluorescein conjugate shows that all 40×–40×–20 $\mu$m gel pads have a similar fluorescence intensity and contain, therefore, similar amount of immobilized protein.

Two procedures were used to produce microchips containing different compounds. In the first procedure (FIG. 2D), four oligonucleotide monomer solutions placed between two glass plates were separated with spacers. The simultaneous illumination of these solutions through a mask produced a microchip with different immobilized oligonucleotides.

FIG. 4 shows four successive hybridizations of such a microchip with different fluorescently labeled probes, each complementary to one of copolymerized oligonucleotides. However, such a method is difficult to accommodate when manufacturing microchips containing gel pads much smaller than 0.5×0.5 mm. To prepare gel pads in the range of 100 $\mu$m or less, the solutions containing different oligonucleotide monomers are successively injected into the space between the glass plates and illuminated each time through masks having transparent windows in different positions (FIG. 2B). A microchip with 0.5 mm gel pads that is similar to those shown in FIG. 4 was manufactured by this alternative procedure (data not shown). No cross-contamination of copolymerized oligonucleotides was identified on the hybridization pattern.

Figure 5:
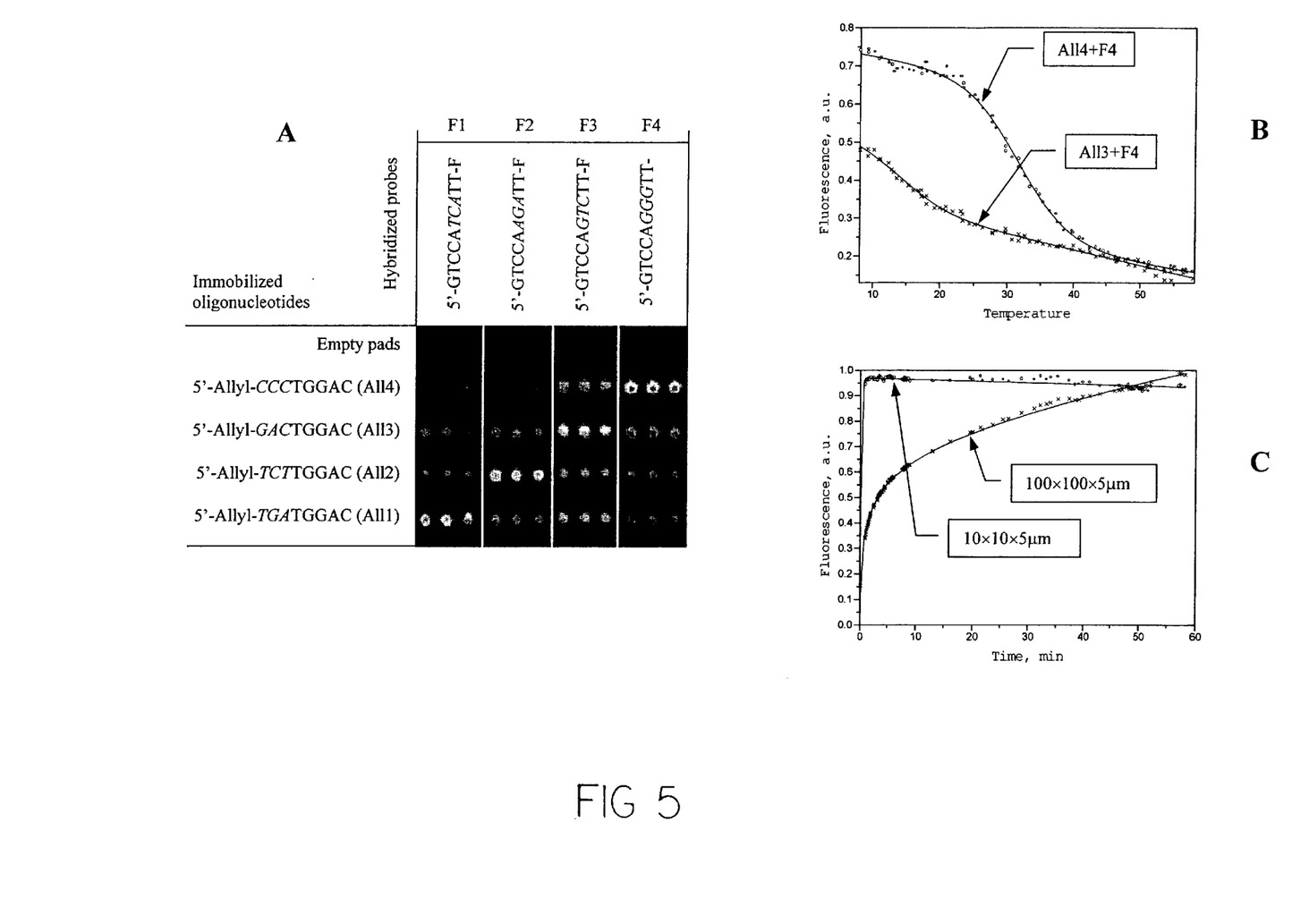
FIGS. 5A and 5C depict a pattern of hybridization of a microchip, in accordance with features of the present invention.

Comparative kinetics of hybridization of a fluorescently labeled probe with a complementary oligonucleotide immobilized within a 10×10×5 $\mu$m and a 100×100×5 $\mu$m gel pad of the microchip is depicted in FIG. 5. The pattern of hybridization of a microchip photopolymerized under the microscope is shown on FIG. 5A. The microchip represents four rows of 10×10⊖5 $\mu$m gel pads containing different copolymerized oligonucleotides. One can see that the fluorescence label is associated with the perfect as well as with the mismatched duplexes because the hybridization was carried out under non-stringent conditions.

The measurement of the melting curves of these microchip duplexes allows a reliable discrimination between the perfect and mismatched duplexes. For example, using this method, the perfect duplex formed by oligonucleotides All4 and F4 can be easily differentiated from the mismatch duplex All3–F4, as shown in FIG. 5B.

FIG. 5C shows that the hybridization of probes with oligonucleotides immobilized within 10×10×5 $\mu$m gel pad is significantly faster than for a 100×100×5-$\mu$m pad. The two separate pads were especially prepared with equal height. It should be taken into account that the surface-to-volume ratio in the case of the 5-$\mu$m pads is equal to 0.6 $\mu m^{-1}$, while for the 100-$\mu$m pads it is only 0.24 $\mu m^{-1}$. On the other hand, these data may be interpreted in terms of the more porous (or more developed) side gel surface rather than the surface that contacted the mask during polymerization.

Four solutions containing different butendiol-oligodeoxynucleotides and other components of the polymerization mixture were consecutively passed through the polymerization chamber. Each solution was irradiated with visible light projected with a microscope through a selected row of mask windows. The produced microchip contained four different oligonucleotides attached to 10×10×5-$\mu$m gel pads arranged in four lines, and one line of pads without oligonucleotides.

The microchip hybridized consecutively with four fluorescein-labeled probes (F-FITC) complementary to one of the four immobilized oligonucleotides.

Equilibrium melting curves of a perfect and a mismatched duplex formed on the microchip.

In summary, the method described for manufacturing microarrays of gel-immobilized compounds on chips (MAGIChips) consists of two steps: application of solutions to be polymerized (comonomers) onto a surface and copolymerization of acrylamide/bisacrylamide with unsaturated monomers chemically attached to different compounds. The copolymerization is catalyzed by radicals and initiated by either persulfate or light illumination of solutions containing methylene blue. Copolymerization of acrylamide/bisacrylamide with acryl-oligonucleotides has been introduced to carry out electrophoretic fractionation of DNA on oligonucleotide-containing polyacrylamide gels.

The advantages of microchips containing such small gel pads are higher sensitivity and much faster kinetics of hybridization. The decrease in the size of gel pads significantly increases the surface/volume ratio and therefore significantly facilitates the diffusion of substances into the gel. The smaller sized gels or polymer structures are made possible by either physical separation of the structures during copolymerization processes (via, for example the imposition of a nonpolar material over the entire array topography), or by selective irradiation of preselected portions of a solid substrate supporting the location of yet to be polymerized monomers in solution.

The attachment of an acryloyl group to streptavidin followed by copolymerization to make a protein microchip was demonstrated. Many chemical reactions led to different compounds with residues containing unsaturated double bonds. This allowed microchips with a large variety of immobilized compounds to be produced. On the other hand, unsaturated monomers can be incorporated during synthesis of the microchip compounds. Allyl-phosphoramidites and butendiol-phosphoramidites were synthesized and accommodated for standard monomer-oligonucleotide production.

The copolymerization method can be considered an alternative approach to the conventional three-step procedure of making MAGIChips, which are 1.) the fabrication of the gel pad array, 2.) the application of solutions onto the gel pads, and 3.) the chemical immobilization of the compounds in solution to the gel. An important drawback to the three-step method is the difficulty in handling gel pads smaller than 40×40 $\mu$m. The invented method facilitates the production of copolymerized gel pads that can be as small as 3×3 $\mu$m.

While the invention has been described with reference to details of the illustrated embodiments, these details are not intended to limit the scope of the invention as defined in the appended claims.

The embodiment of the invention in which an exclusive property or privilege is claimed is defined as follows:

1. A method for making discrete porous entities, each entity containing a different molecule, the method comprising:

a) positioning each different molecule at individual positions on an inert substrate wherein the molecule contains an unsaturated moiety;
b) contacting each of the positioned molecules with a liquid capable of being polymerized; and
c) copolymerizing the liquid and the molecules.

2. The method as recited in claim 1 wherein the discrete entities are solid and porous.

3. The method as recited in claim 1 wherein the step of copolymerizing the liquid and molecules further comprises contacting the liquid and molecules with free radicals.

4. The method as recited in claim 1 wherein the liquid and molecules are surrounded by a means to prevent their drainage from the substrate.

5. The method as recited in claim 3 wherein the radicals are dispersed in a vehicle which simultaneously submerges all of the positions.

6. The method as recited in claim 1 wherein the step of solidifying the liquid and molecules further comprises reacting the liquid and molecules with a persulfate.

7. The method as recited in claim 6 wherein the persulfate is a liquid-phase compound selected from the group consisting of sodium persulfate, analogs of sodium persulfate soluble in hydrophobic solvent, and combinations thereof.

8. The method as recited in claim 1 wherein the step of solidifying the liquid and molecules further comprises adding a methylene blue derivative to the liquid and molecules and then subjecting the liquid and molecules to light.

9. The method as recited in claim 3 wherein the liquid capable of polymerizing in the presence of free radicals is acrylamide, or acrylamide/bisacryl-amide, or N acylacrylamide, or N,N,N',N'bisacrylamide or N-acryoyl trisamino methane, or N,N'diallyl tartardiamide, or combinations thereof.

10. The method as recited in claim 5 wherein the vehicle is a nonpolar compound selected from the group consisting of hexane, chloroform, dichloroethane, mineral oil, and combinations thereof.

11. The method as recited in claim 1 wherein the liquid comprises a compound and the compound is covalently bonded to the inert substrate.

12. The method as recited in claim 11 wherein the compound covalently bonds to the inert substrate when the liquid and molecules are polymerized.

* * * * *